United States Patent
Hunzinger

(10) Patent No.: US 6,564,062 B1
(45) Date of Patent: May 13, 2003

(54) PILOT SEARCH TO DETERMINE PROCESSOR LOADING

(75) Inventor: Jason F. Hunzinger, Carlsbad, CA (US)

(73) Assignee: Denso Corporation, Kariya (JP)

(*) Notice: Subject to any disclaimer, the term of this patent is extended or adjusted under 35 U.S.C. 154(b) by 551 days.

(21) Appl. No.: 09/591,027

(22) Filed: Jun. 9, 2000

(51) Int. Cl.⁷ .................. H04B 1/703; H04L 27/30; H04J 13/00
(52) U.S. Cl. ................ 455/453; 455/67.1; 330/50; 370/328
(58) Field of Search ................ 455/453, 67.1, 455/428, 12.1, 13.3, 33.1–33.4, 427, 101, 103; 370/328, 329, 331–333, 466, 59; 330/50, 149; 375/141, 146, 147, 148, 206, 267, 299

(56) References Cited

U.S. PATENT DOCUMENTS

| | | | | |
|---|---|---|---|---|
| 5,056,109 A | * | 10/1991 | Gilhousen et al. | 370/342 |
| 5,166,634 A | * | 11/1992 | Narahashi et al. | 330/151 |
| 5,828,957 A | * | 10/1998 | Kroeger et al. | 455/428 |
| 6,141,542 A | * | 10/2000 | Kotzin et al. | 455/101 |
| 6,173,005 B1 | * | 1/2001 | Kotzin et al. | 375/141 |
| 6,377,563 B1 | * | 4/2002 | Jeon et al. | 370/335 |
| 6,385,183 B1 | * | 5/2002 | Takeo | 370/335 |
| 6,393,005 B1 | * | 5/2002 | Mimura | 370/335 |

* cited by examiner

Primary Examiner—Vivian Chin
Assistant Examiner—Kamran Afshar
(74) Attorney, Agent, or Firm—Harness, Dickey & Pierce, PLC

(57) ABSTRACT

A method is described for mobile stations to measure the desired processing load to monitor pilot signals of multiple base stations. The amount of processing load available to a mobile station is limited. To reduce costs, manufactures attempt to reduce the amount of processor load in a mobile station. Continually searching for pilot signals and processing the results of pilot signal searches consumes processor load. The mobile station of the present invention indicates the search rate of secondary pilot signals may be changed based on the search rate of a reference pilot signal. The mobile station may also indicate an adjustment may be made to the amount of time spent searching for pilot signals by adjusting a variable length timer based on a determined safe search rate.

12 Claims, 3 Drawing Sheets

PILOT SEARCH TO DETERMINE PROCESSOR LOADING

TECHNICAL FIELD

This invention relates to wireless communication systems, and more particularly to a method for defining the rate at which mobile stations search for pilot signals.

BACKGROUND

The use of wireless communication systems is growing with users now numbering well into the millions. One of the popular wireless communications systems is the cellular telephone, having a mobile station (or handset) and a base station. Cellular telephones allow a user to talk over the telephone without having to remain in a fixed location. This allows users to, for example, move freely about the community while talking on the phone.

Cellular telephones may operate under a variety of standards including the code division multiple access (CDMA) cellular telephone communication system as described in TIA/EIA, IS-95, Mobile station-Base Station Compatibility Standard for Dual-Mode Wideband Spread Spectrum Cellular System, published July 1993. CDMA is a technique for spread-spectrum multiple-access digital communications that creates channels through the use of unique code sequences. In CDMA systems, signals can be and are received in the presence of high levels of interference. The practical limit of signal reception depends on the channel conditions, but CDMA reception in the system described in the aforementioned IS-95 Standard can take place in the presence of interference that is 18 dB larger than the signal for a static channel. Typically the system operates with a lower level of interference and dynamic channel conditions.

A CDMA base station communicates with a mobile station with a signal having a basic data rate of 9600 bits/s. The signal is then spread to a transmitted bit rate, or chip rate, of 1.2288 MHz. Spreading applies digital codes to the data bits, which increase the data rate while adding redundancy to the CDMA system. The chips of all the users in that cell are then added to form a composite digital signal. The composite digital signal is then transmitted using a form of quadrature phase shift keying (QPSK) modulation that has been filtered to limit the bandwidth of the signal.

Base stations inform mobile stations that a call has been placed to it over a forward channel referred to as a paging channel. However, before the mobile station can monitor the paging channel, it must first determine from which base station it will monitor the paging channel. The mobile station preferably monitors the base station that provides the strongest channel signal.

To set up communications with the mobile stations, each base station continuously transmits a pilot channel signal. The pilot signal transmitted by each base station has the same spreading code but with a different code phase offset. Phase offset allows the pilot signals to be distinguished from one another, which in turn allows the base stations to be distinguished. These pilot signals are detected by the mobile stations to obtain initial system synchronization and to provide robust time, frequency, and phase tracking of the base station transmitted signals. To ensure flexibility, mobile stations monitor the pilot signal from multiple base stations. This allows the mobile station to be ready to communicate with a number of base stations.

SUMMARY

The present invention is a method to measure the desired processing power for mobile stations to monitor pilot signals of multiple base stations. The amount of processing power available to a mobile station is limited. To reduce costs, manufactures attempt to reduce the amount of processor power in a mobile station. Continually searching for pilot signals and processing the results of pilot signal searches consumes processor power. The mobile station of the present invention indicates the search rate of secondary pilot signals may be changed based on the search rate of a reference pilot signal. The mobile station may also indicate an adjustment may be made to the amount of time spent searching for pilot signals by adjusting a variable length timer based on a determined safe search rate.

DESCRIPTION OF DRAWINGS

These and other features and advantages of the invention will become more apparent upon reading the following detailed description and upon reference to the accompanying drawings.

DETAILED DESCRIPTION

Figure 1:
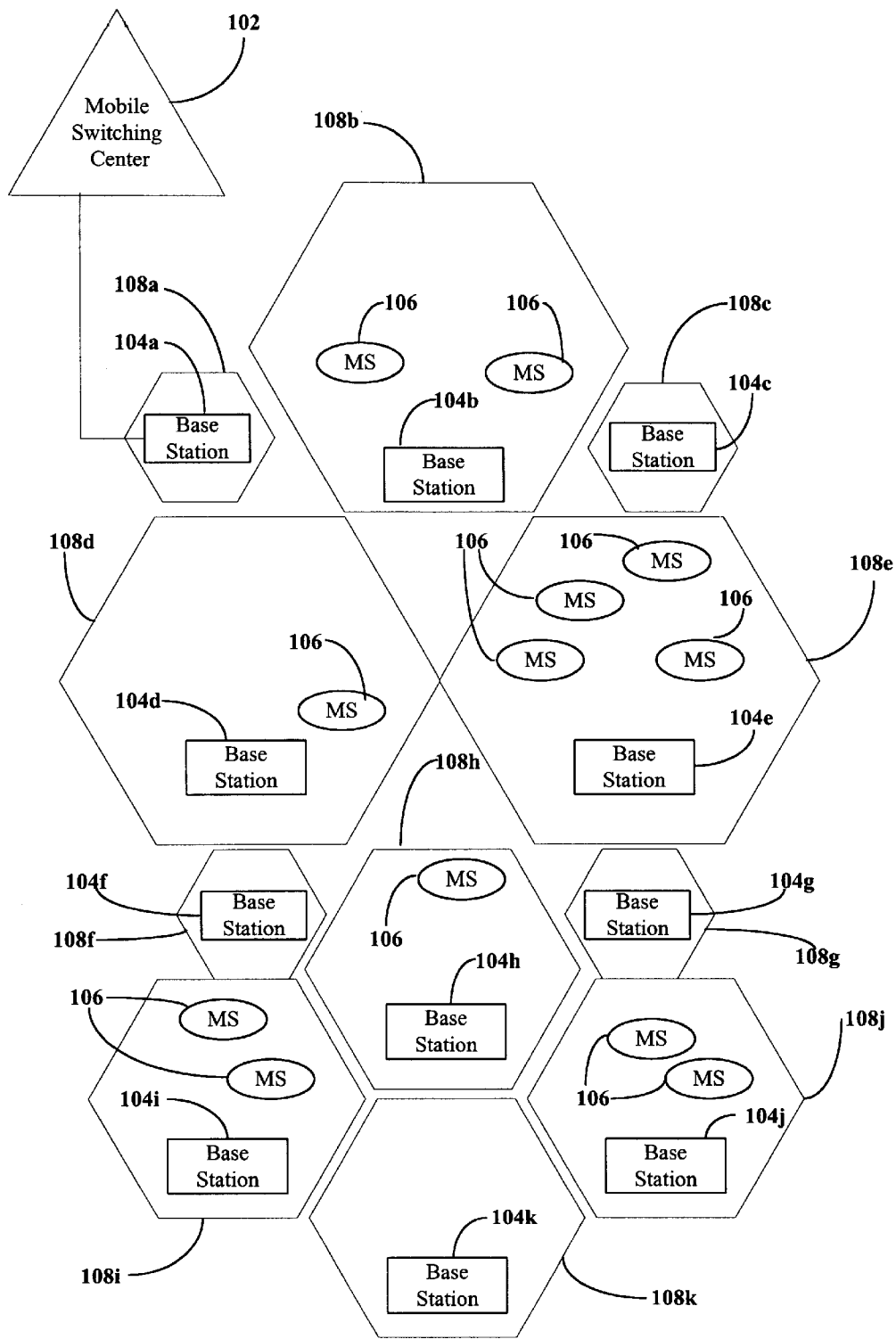
FIG. 1 illustrates the components of an exemplary wireless communication system used by the present invention.

FIG. 1 illustrates components of an exemplary wireless communication system. A mobile switching center 102 communicates with base stations 104a–104k (only one connection shown). The base stations 104a–104k (generally 104) broadcasts data to and receives data from mobile stations 106 within cells 108a–108k (generally 108). The cell 108 is a geographic region, roughly hexagonal, having a radius of up to 35 kilometers or possibly more.

A mobile station 106 is capable of receiving data from and transmitting data to a base station 104. In one embodiment, the mobile station 106 receives and transmits data according to the Code Division Multiple Access (CDMA) standard. CDMA is a communication standard permitting mobile users of wireless communication devices to exchange data over a telephone system wherein radio signals carry data to and from the wireless devices.

Under the CDMA standard, additional cells 108a, 108c, 108d, and 108e adjacent to the cell 108b permit mobile stations 106 to cross cell boundaries without interrupting communications. This is so because base stations, 104a, 104c, 104d, and 104e in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

To assist the mobile stations 106 in moving between cells, each base station 104 transmits a pilot signal. These pilot signals are detected by the mobile stations 106 to obtain initial system synchronization and to provide robust time, frequency, and phase tracking of the signal transmitted by the base station 104. To ensure flexibility, mobile stations 106 monitor the pilot signal from multiple base stations 104. This allows the mobile station 106 to be ready to communicate with a number of base stations 104.

Mobile stations 106 may move about freely within the cell 108 while communicating either voice or data. Mobile stations 106 not in active communication with other telephone system users may, nevertheless, scan base station 104 transmissions in the cell 108 to detect any telephone calls or paging messages directed to the mobile station 106. To detect these paging messages, the mobile station 106 first detects the pilot signal of a base station 104 to obtain system synchronization and phase tracking.

One example of such a mobile station 106 is a cellular telephone used by a pedestrian who, expecting a telephone call, powers on the cellular telephone while walking in the cell 108. The cellular telephone scans certain frequencies (frequencies known to be used by CDMA) to synchronize communication with the base station 104. The cellular telephone then registers with the mobile switching center 102 to make itself known as an active user within the CDMA network.

When detecting a call, the cellular telephone scans data frames broadcast by the base station 104 to detect any telephone calls or paging messages directed to the cellular telephone. In this call detection mode, the cellular telephone receives, stores and examines paging message data, and determines whether the data contains a mobile station 106 identifier matching an identifier of the cellular telephone. If a match is detected, the cellular telephone establishes a call with the mobile switching center 102 via the base station 104. If no match is detected, the cellular telephone enters an idle state for a predetermined period of time, then exits the idle state to receive another transmission of paging message data.

When attempting to place a call, the mobile station 106 sends a connection request to the base station 104. If a traffic channel is available, the mobile station 106 connects to the base station and transmits the call information along the traffic channel. However if no traffic channel is available, the mobile station 106 waits a predetermined amount of time and then attempts to reconnect.

Figure 2:
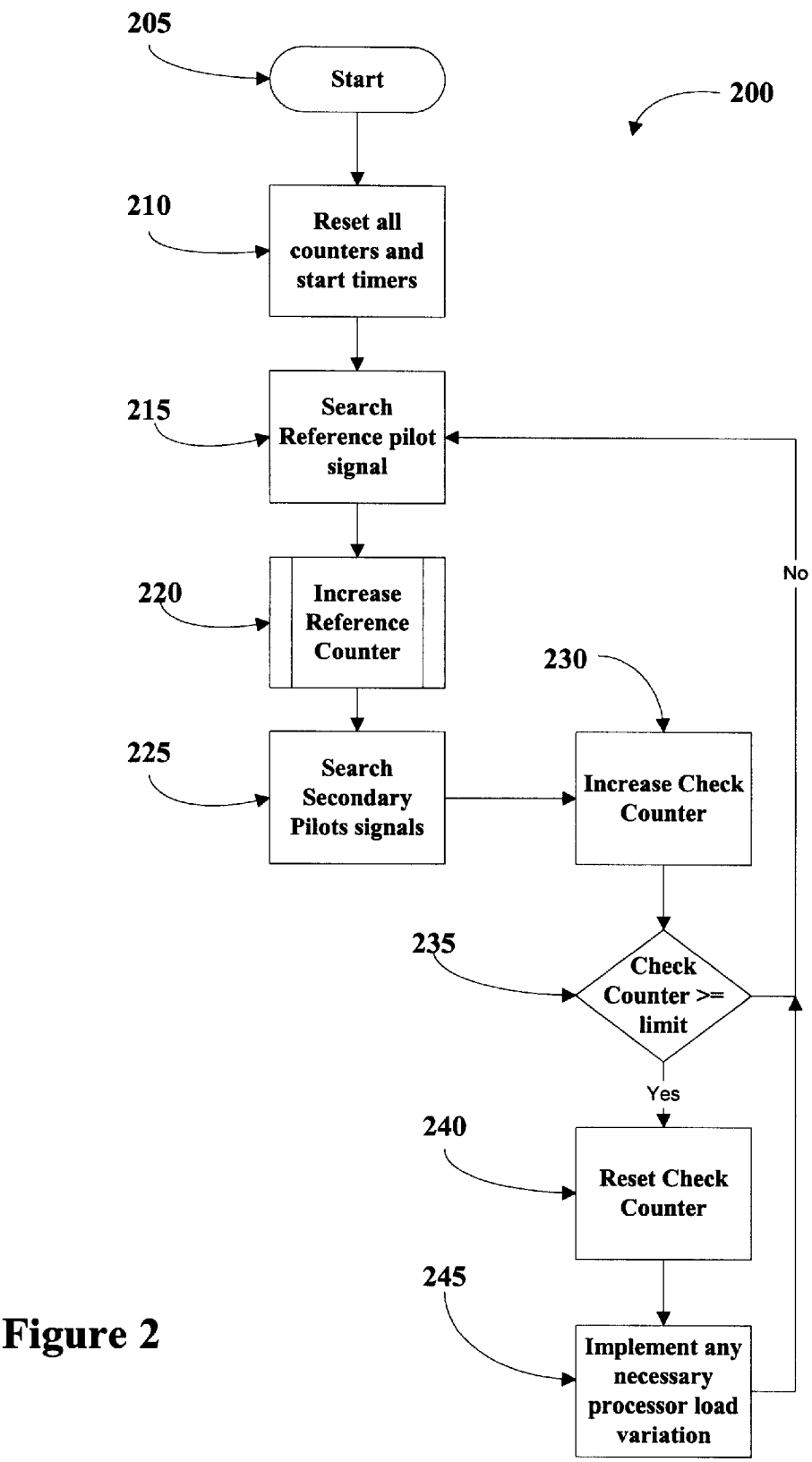
FIG. 2 is a flowchart illustrating a process for limiting the search rate of pilot signals by a mobile station.

A process for determining the search rate of pilot signals is illustrated in FIG. 2. The process 200 begins at a start state 205. Proceeding to state 210, the process 200 resets all counters and starts any timers. Included among the counters and timers is a check counter, a timeout timer, a reference counter. The reference counter indicates the number of times in a cycle the reference pilot has been searched. The secondary pilots are searched at a rate dependent on the reference pilot, and the reference counter may be used to determine when to search the secondary pilots. The timeout timer can be used to slow down the search process, and therefore limit the processor loading. The check counter is used to determine the number of times the reference pilot is searched before enabling the timeout timer.

Proceeding to state 215, the process 200 searches for the reference pilot signal. The reference pilot signal is generally the pilot signal of the cell where the mobile station 106 is physically located. However, under certain circumstances, the reference pilot signal may be the pilot signal of a neighboring cell. The factors that determine which pilot signal is the reference pilot signal are well known in the art and will not be described herein.

Proceeding to state 220, after the reference pilot signal has been acquired, the process 200 increments the reference counter 220. The reference counter maintains a running tally of the number of times the mobile station 106 has searched for the reference pilot signal since the reference counter was reset. In addition to incrementing the reference counter, state 220 includes sub-functions which will be described below in reference to FIG. 3.

Proceeding to state 225, the process 200 searches for one or more secondary pilot signals. In state 225, the mobile station 106 may not search for every secondary pilot signal. The secondary pilot signals are searched at a rate based off the reference pilot signal. For example, the mobile station 106 may determine that a particular secondary pilot signal may only need to be acquired half as often as the reference pilot signal. The mobile station 106 would therefore only search for this secondary pilot signal during every other execution of state 225. Of course, the rate of searching for each secondary pilot signal may vary.

Proceeding to state 230, the process 200 increases the check counter. The check counter is used to determine the number of times the reference pilot is searched before enabling the timeout timer. The mobile station 106 may maintain the check counter in a processor.

Proceeding to state 235, the process 200 determines if the current value of the check counter equals, or is greater than, a preset limit. The mobile station 106 may be preprogrammed with the maximum value of the check counter, or the limit may be determined from historic data obtained from the mobile station 106. The preset limit of the check counter defines the number of times the mobile station 106 may search for the reference pilot before checking the timeout timer. If the check counter has not reached the preset limit, the process 200 returns to state 215 to again search for the reference pilot signal. The process 200 remains in the loop defined by states 215, 220, 225, 230, and 235 until the check counter value equals.or exceeds the preset limit.

Returning to state 235, if the check counter value equals or exceeds the preset limit, the process 200 proceeds to state 240. In state 240, the mobile station 106 resets the value of the check counter. After resetting the counter, the process 200 proceeds to state 245.

In state 245, the mobile station 106 implements any necessary variation in processor loading. For example, the process may delay for completion of the timeout timer before any further searching. This would, for example, decrease the number of times the mobile station 106 searches for the reference pilot signal during any given time period, thereby reducing processor loading. The mobile station 106 then repeats states 215–245 while activated to maintain connection with a base station.

Figure 3:
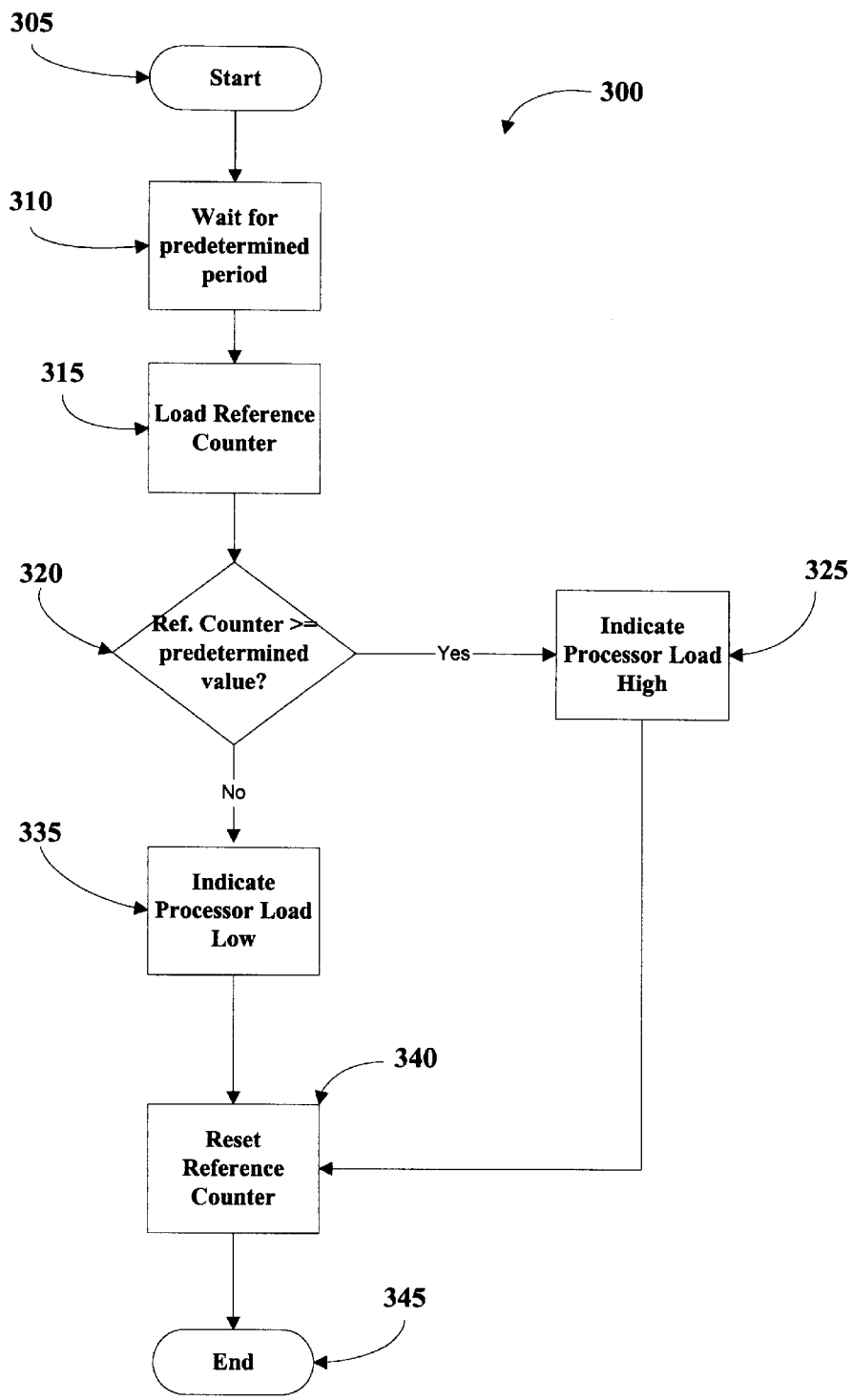
FIG. 3 is a flowchart illustrating a process for varying the value of the timeout timer based on the search rate of the reference pilot signal.

FIG. 3 illustrates a sub-process 300 of state 220 of FIG. 2. The sub-process 300 is used to indicate the processor loading may be adjusted by varying the value of the timeout timer based on the search rate of the reference pilot signal. The sub-process 300 begins at a start state 305. Proceeding to state 310, the sub-process 300 waits for a predetermined period of time. The sub-process 300 waits to allow the process 200 to search for the reference pilot signal multiple times, increasing the reference counter with each search. Based on historical data, experimentation, calculation, or other methods, the mobile station 106 can determine a maximum safe value to search the reference pilot signal. The predetermined period of time to wait in state 310 is defined by the maximum safe value.

After expiration of the predetermined period of time, the sub-process 300 proceeds to state 315. In state 315, the sub-process 300 detects the value of the reference counter. The reference counter communicates the number of times that the mobile station 106 has searched for the reference pilot signal.

Proceeding to state 320, the sub-process 300 compares the value of the reference counter to a predetermined value. The predetermined value is again based on a maximum safe value to search the reference pilot signal. Because the mobile station 106 has waited a predetermined amount of time in state 310, the mobile station 106 can define the maximum number of times the reference pilot signal needs to be searched for during that period. This number is the predetermined value that is compared to the value of the reference counter.

If the value of the reference counter is greater than or equal to the predetermined value, the reference pilot signal is being searched more often than necessary, thereby increasing processor loading. In this circumstance, the sub-process 300 proceeds along the YES branch to state 325. In state 325, the sub-process indicates the processor load is high and may be reduced by slowing down the rate at which the reference pilot signal is searched. This can be accomplished, for example, by increasing the value of the timeout timer, thereby decreasing the number of times the mobile station 106 searches for the reference pilot signal during any given time period.

Returning to state 320, if the value of the reference counter is less than the predetermined value, the reference pilot signal is being searched less often than necessary. In this circumstance, the sub-process 300 proceeds along the NO branch to state 335. In state 335, the sub-process 300 indicates the processing load is low and may be increased by increasing the rate at which the reference pilot signal is searched This may be accomplished, for example, by decreasing the value of the timeout timer, thereby increasing the number of times the mobile station 106 searches for the reference pilot signal during any given time period.

The sub-process proceeds to state 340 after indicating the processor load in states 325 or 335. In state 340, the value of the reference counter is reset. The reference counter may then begin incrementing once again according to the process 200.

Numerous variations and modifications of the invention will become readily apparent to those skilled in the art. Accordingly, the invention may be embodied in other specific forms without departing from its spirit or essential characteristics.

What is claimed is:

1. A method of determining a desired processing load in a mobile communication system comprising:

detecting a reference pilot signal at a defined rate;

searching for secondary pilot signals based on the defined rate; and after said detecting and said searching, determining the processing load based on the defined rate.

2. The method of claim 1, further comprising indicating the ability to change the processing load by adjusting the given amount of time to suspend the detection of the pilot signals.

3. The method of claim 2, wherein the given amount of time is adjusted based on a number of times that the reference pilot signal is detected during a predetermined period of time.

4. The method of claim 1, wherein the secondary pilot signals are searched at a rate less than the defined rate.

5. A mobile station comprising:

a pilot signal detector which detects pilot signals at a defined rate;

a reference counter which increments at each pilot signal detection; and a processor load indicator which indicates high loading when the reference counter exceeds a predetermined value.

6. The mobile station of claim 5, wherein the pilot signal detector detects a reference pilot signal and secondary pilot signals.

7. The mobile station of claim 6, wherein the pilot signal detector detects the reference pilot signal at a first rate and the secondary signal at a second rate.

8. The mobile station of claim 7, wherein the first rate is greater than the second rate.

9. The mobile station of claim 5, wherein the processor load indicator indicates low loading when the reference counter is below the predetermined value.

10. A method comprising:

searching for a reference pilot signal, by a predetermined number of times, at a first rate;

searching for secondary pilot signal at a second rate; and after said searching for the reference pilot signal and the secondary pilot signal, determining the processor load based on the search results.

11. The method of claim 10, wherein the second rate is a function of the first rate.

12. The method of claim 10, wherein the processor load is determined based on an amount of time required to search for the reference pilot signal a predetermined number of times.

* * * * *